United States Patent
Hellmuth et al.

(10) Patent No.: US 10,284,882 B2
(45) Date of Patent: May 7, 2019

(54) PRODUCTION OF ALTERNATIVE VIEWS FOR DISPLAY ON DIFFERENT TYPES OF DEVICES

(71) Applicant: NBA Properties, Inc., New York, NY (US)

(72) Inventors: Stephen Hellmuth, Short Hills, NJ (US); Frank Harvey, Eatontown, NJ (US); John Zulick, North Brunswick, NJ (US); Andrew B. Surfer, Goshen, NY (US)

(73) Assignee: NBA Properties, Inc., New York, NY (US)

( * ) Notice: Subject to any disclaimer, the term of this patent is extended or adjusted under 35 U.S.C. 154(b) by 5 days.

(21) Appl. No.: 15/693,155

(22) Filed: Aug. 31, 2017

(65) Prior Publication Data

US 2019/0068997 A1    Feb. 28, 2019

(51) Int. Cl.
| | |
|---|---|
| *H04N 21/218* | (2011.01) |
| *H04N 21/4223* | (2011.01) |
| *H04N 21/2343* | (2011.01) |
| *H04N 21/234* | (2011.01) |
| *H04N 21/414* | (2011.01) |

(52) U.S. Cl.
CPC . *H04N 21/21805* (2013.01); *H04N 21/23424* (2013.01); *H04N 21/23439* (2013.01); *H04N 21/234363* (2013.01); *H04N 21/41407* (2013.01); *H04N 21/4223* (2013.01)

(58) Field of Classification Search
CPC .................................................. H04N 2101/00
See application file for complete search history.

(56) References Cited

U.S. PATENT DOCUMENTS

| | | |
|---|---|---|
| 7,149,549 B1 | 12/2006 | Ortiz et al. |
| 7,376,388 B2 | 5/2008 | Ortiz et al. |
| 7,620,426 B2 | 11/2009 | Ortiz et al. |
| 7,630,721 B2 | 12/2009 | Ortiz |
| 7,782,363 B2 | 8/2010 | Ortiz |
| 7,796,162 B2 | 9/2010 | Ortiz |
| 7,812,856 B2 | 10/2010 | Ortiz et al. |
| 7,826,877 B2 | 11/2010 | Ortiz et al. |
| 7,884,855 B2 | 2/2011 | Ortiz |
| 8,086,184 B2 | 12/2011 | Ortiz et al. |
| 8,090,321 B2 | 1/2012 | Ortiz et al. |
| 8,184,169 B2 | 5/2012 | Ortiz |
| 8,270,895 B2 | 9/2012 | Ortiz et al. |
| 8,319,845 B2 | 11/2012 | Ortiz |
| 8,401,460 B2 | 3/2013 | Ortiz et al. |
| 8,583,027 B2 | 11/2013 | Ortiz et al. |
| 8,610,786 B2 | 12/2013 | Ortiz |
| 8,750,784 B2 | 6/2014 | Ortiz et al. |
| 8,971,914 B2 | 3/2015 | Ortiz |
| 9,031,537 B2 | 5/2015 | Ortiz |
| 9,147,299 B2 | 9/2015 | Ortiz |

(Continued)

*Primary Examiner* — Michael H Hong
(74) *Attorney, Agent, or Firm* — Vinson & Elkins LLP

(57) ABSTRACT

A system and method for producing alternative view video programming. The system and method may include capturing alternative view video data; integrating the video data with a standard feed created for typical consumption; converting the integrated data into a file structure appropriate for distribution; sending the file(s) to a distributor for delivery to an end user.

8 Claims, 4 Drawing Sheets

(56) References Cited

U.S. PATENT DOCUMENTS

| | | | |
|---|---|---|---|
| 2015/0201134 A1* | 7/2015 | Carr | G06F 3/04842 348/143 |
| 2016/0043879 A1* | 2/2016 | Chandwani | H04L 12/189 370/312 |

* cited by examiner

PRODUCTION OF ALTERNATIVE VIEWS FOR DISPLAY ON DIFFERENT TYPES OF DEVICES

FIELD OF THE INVENTION

The invention generally relates to the field of video production, and more specifically to the production of alternative video content for display on different types of devices.

BACKGROUND OF THE INVENTION

The use of mobile devices as a platform for media consumption is on the rise. A growing number of users are choosing to view media through their phones, tablets, or other devices with screens that are smaller than a typical consumer's television. Some users may wish to watch video content on a smart watch with a square or round display. Video content that is framed and composed for playback or display on a television screen may not be seen or followed as easily on a small screen found on a mobile device. This is especially true for video of sporting events or other types of events that often involve wide fields of view. A standard broadcast view, intended to be viewed on a television, might show a large portion of a playing field or court or concert stage, with players or musicians spread across the screen. But if that same view is displayed on a small screen, for example on a mobile device, it might be difficult to see the individuals or follow the event.

The problem cannot simply be solved by displaying a zoomed-in or enlarged view of video content that is framed and composed for traditional broadcast television. Camera views designed for display or playback on a television use the full field of view to show the action, and the focus of the shot, e.g., the ball carrier, may not always be centered in that field of view. Thus, simply zooming in on the center of the full frame may lose important aspects of the images that fall outside the smaller, zoomed-in, frame. Action falling above, below, or to the side of the smaller, zoomed-in, frame would not be shown to the user. For example, players' heads could be cropped from view, or the arc of a basketball shot may pass outside the frame.

Zooming in or cropping video may also lead to loss of video quality. If video that is framed and composed for television playback is encoded at a certain resolution, a zoomed-in portion of that video may have to be resized for display, potentially resulting in a loss of video quality. Further, if the zooming-in is done at the playback device, e.g., a smartphone, video data is sent to the device that is not used by the end user. For mobile devices, which often have limited bandwidth, this approach is also potentially inefficient.

It would also be inefficient to produce and distribute, in parallel with a traditional television broadcast, a broadcast intended for playback or viewing on a device other than a television with entirely duplicate personnel, equipment, and infrastructure. Video production and distribution for an event involves a significant amount of personnel, equipment, and infrastructure. For example, video production for a typical sporting event involves dozens of people to operate the cameras, direct the camera shots, select and switch which camera feed is "live" for the program, manage the equipment, and coordinate with distributors of the program. There might be more than ten cameras in operation, a local production truck filled with equipment and producers, and a central processing facility that inserts additional content, manages the program, and packages the program for delivery to distributors.

Despite the increased availability and popularity of video playback devices with screens differing in size from televisions, limitations like these have left content providers who wish to produce and distribute video programming for playback on these other types devices, e.g., smartphones or tablets, with undesirable options. Thus, what is needed are systems and methods for providing alternative view video.

SUMMARY OF THE INVENTION

A method and system are disclosed for simultaneously preparing alternative view video programming. Currently, typical broadcasts are presented in a format that is intended for user consumption on large displays of television sets or projector screens. For events that incorporate multiple camera feeds mixed together in real time, the effort and expense required to coordinate the various camera views is significant. The disclosed method and system can provide a different experience for users viewing video programming on an alternative display or playback device such as a mobile device. Existing hardware including cameras and production equipment can be adapted for use in the methods and systems disclosed herein with minimal additional equipment and expense to deliver the video programming. In certain embodiments, the methods and systems can provide an alternative video feed while retaining some of the video and/or audio used for traditional larger screen broadcast in a way that allows for an alternative viewing experience in a cost-effective manner.

In some embodiments, the system comprises a plurality of cameras. In some embodiments of the system, a plurality of cameras comprises a set of cameras typically in use for broadcasting events, with one or more of the plurality of cameras designated to capture an alternative view of the content. In another embodiment, the system comprises a camera feed selection subsystem operative to process the images captured by the plurality of cameras to create a first program. Such a subsystem may comprise video routing and management equipment such as a production switcher operable to switch between camera feeds and distribution equipment for sending the program to broadcast networks or other distributors. In another embodiment, the system comprises a camera feed substitution subsystem that substitutes images from one camera (with an alternative view) for images from another camera (with a typical view) to create a second program (alternative view program) that is substantially similar to a first program (typical view program) except the alternative view images are substituted for the typical view images.

In some embodiments, a production switcher is used to make the same selections as another production switcher to produce a second program substituting the alternative view for the typical view. In some embodiments, the system may be applied to sporting events. In some embodiments, the system is used for live creation of programming. In some embodiments, the system is used to create a program for mobile device viewing.

In some embodiments, the system comprises a first, second, and third camera. In some embodiments, a first camera feed and second camera feed are input to a first switch to create a first output, and the second camera feed and a third camera feed are input to a second switch to create a second output. In some embodiments, one of the cameras designated to capture an alternative view is located near one of the other cameras. In some embodiments, a third camera provides a tighter field of view than a first camera. In some embodiments, the systems and methods are used at an event. In some embodiments, the systems and methods are used at a basketball game.

In some embodiments, a first output is provided to a first type of device and a second output is provided to a second type of device. In some embodiments, the first and second devices have different screen sizes. In some embodiments, the first type of device is a television or monitor and the second type of device is a mobile device or another device with a screen smaller than a typical television. In some embodiments the first device has a screen with a diagonal size of greater than 18 inches, between 18 to 24 inches, between 24 to 48 inches, between 48 to 58 inches, between 58 to 68 inches, between 68 to 78 inches, or greater than 78 inches. In some embodiments, the second device has a screen with a diagonal size or a diameter size of less than 18 inches, or between 1 to 4 inches, between 4 to 7 inches, between 7 to 10 inches, between 10 to 13 inches, between 13 to 15 inches, or between 15 to 18 inches. In some embodiments, the first and second devices have screens with different resolutions. In some embodiments the first and second devices have screens with different shapes, for example, rectangular, square, or circular, or different aspect ratios, for example, around 4:3, around 16:9, or around 21:9.

In some embodiments, a video processor is adapted to receive a video feed from one or more first video cameras that are adapted to capture video appropriate for viewing on a standard television screen and to simultaneously receive a video feed from one or more second video cameras that capture video appropriate for viewing on a mobile device screen. In some embodiments, a video processor processes the video captured by the one or more first cameras to create a first program, substitutes video from one or more second cameras into the first program at selected intervals in the first program to create a second program, and outputs the first program and second program separately.

BRIEF DESCRIPTION OF THE FIGURES

The foregoing and other features and advantages will be apparent from the following description of particular embodiments of the invention, as illustrated in the accompanying figures. The drawings are not necessarily to scale, but demonstrate the underlying features and principles of various embodiments of the invention.

DETAILED DESCRIPTION OF THE INVENTION

Figure 1:
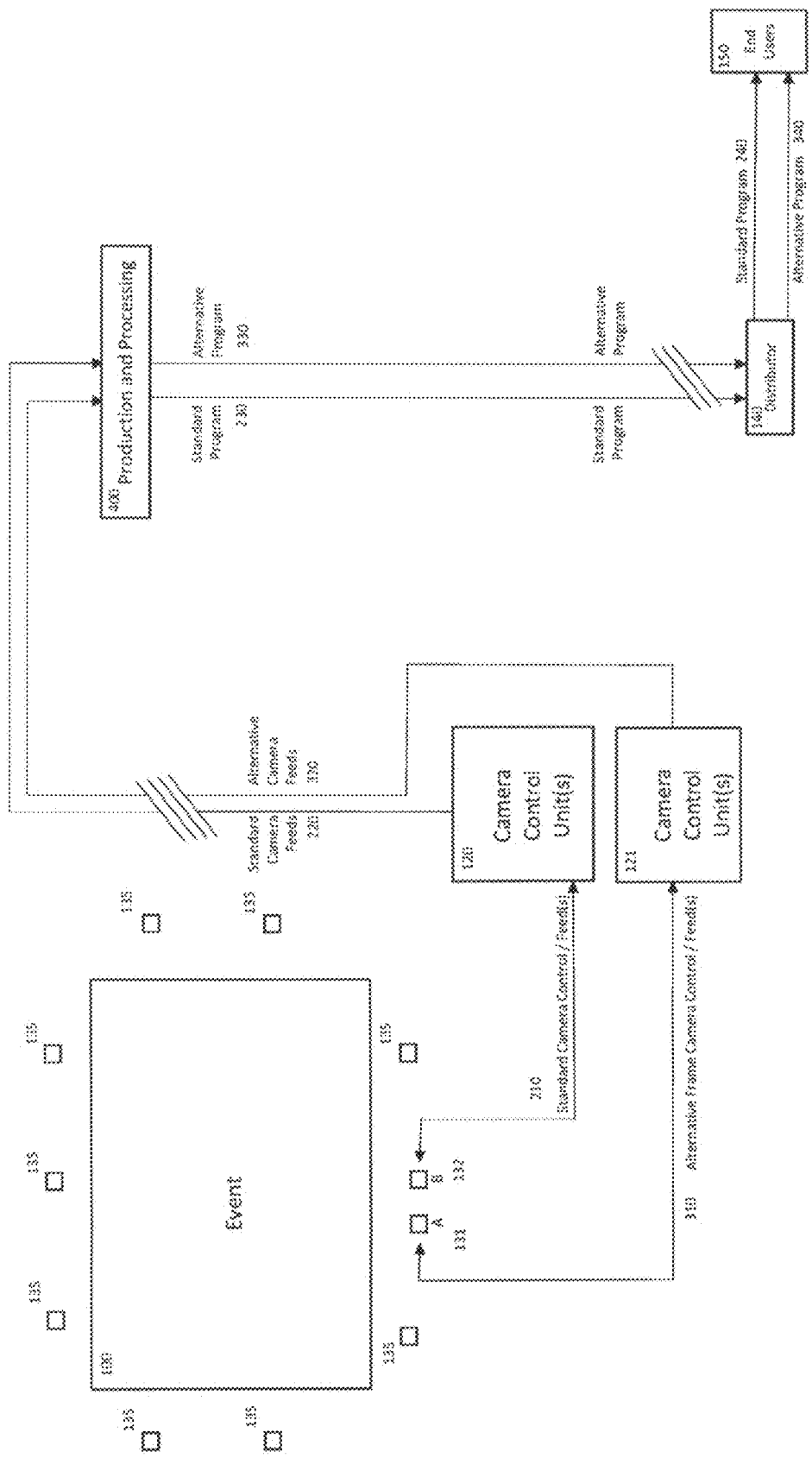
FIG. 1 is a high-level block diagram of a system for distributing live streaming video to end users, and includes a plurality of cameras, local distribution hub, camera control unit, processing facility, and distributor.

A video production system is used to deliver simultaneous video presentations, at least one of which contains video in a personal device viewing format defined herein as a video format adapted for viewing on a small screen such as a viewing screen of a phone, tablet, watch or other portable or wearable device. In certain embodiments of the disclosed method, a first camera, formatted for standard or high definition broadcast television, for example, delivers a first feed of a live action event 100 to a camera control unit, either directly or indirectly, and simultaneously a second camera formatted for personal device viewing, delivers a second feed of at least a portion of the same live event 100, and in certain embodiments the same camera shot to the camera control unit. During the practice of the method, a standard or high definition feed is provided to users by a production and processing facility and at selected portions of the feed a second feed is provided only to users of personal viewing devices.

Video Production and Distribution for Events

Broadcasts of events, such as sporting events, concerts, speeches, or other events, typically involve several different components. Video may be captured at the event by one or more cameras. Audio may be captured at the event by one or more microphones. The various video and audio feeds may then be chosen from and mixed at a production facility to create the broadcast program. From the production facility, the broadcast may be distributed through television networks or streaming services to viewers. The video from the event may also be recorded or stored and distributed later, and, likewise, video from feeds not used for the live broadcast program may be used to provide replays or highlights, either during the event or later. Viewers may watch the video on televisions, monitors, or other devices, such as laptop computers, smartphones, or tablets.

Video of an event may be captured by one or more cameras. When more than one camera is used, the cameras may be in different locations at the event, and each may capture a different aspect or perspective of the event. Some cameras may be focused on specific aspects of the event, for example, such as the player with control of the ball in a sporting event or the featured musician at a concert. Other cameras may capture the event from a wider perspective to show more of the field or the stage, or may capture the audience or spectators at the event. Some cameras operate from fixed positions at the event, while others are mobile and may move around during the event, for example, onto the field or stage.

For a typical professional basketball game broadcast, there are between 8 and 20 cameras, positioned throughout the venue, including, for example, a main play by play camera, goal or backboard cameras, floor cameras, and other cameras that may vary depending on the event. A typical camera for an event captures video digitally, with typical resolutions of up to 1080i or more and stores and transmits video in HD-SDI (high-definition serial digital interface) format. These cameras can send the captured video, while filming, to a production center via powered wire or can operate with battery packs and send the video to a production center wirelessly. The camera may also capture images to be stored as video footage and provide the footage for production or editing later.

The camera feeds can be collected at a production facility. The production facility may be local, often in a production truck at the event, or remote from the event. One aspect of producing an event is selecting and switching which camera feed is "live" for the program that will be distributed to viewers. A team of one or more producers can see what is captured by each of the cameras at the event on a screen or multiple screens in the truck. The production team can choose which camera is in use and when to switch to another camera using one or more production switchers. Production switchers are sometimes also known as vision mixers, video switchers, or video mixers. The production team will use a production switcher to accomplish the feed switching. A production switcher is a device that accepts several video inputs and selects between the inputs to switch which video input is output. Production switchers typically have one or more buses, each of which have a plurality of video inputs and one or more video outputs. For each bus, the production team may select or switch between the video inputs for the video output. When a camera is in use, a signal or "tally" can be sent to the camera that is in use to alert the camera operator that the content that the camera is capturing is the content that is selected for the program at that time.

Similarly, audio from the event may be captured by one or microphones, and the audio from each microphone is provided to the production facility. Microphones may be positioned at fixed locations or may be moved during the event. For a typical basketball game, there are up to 20 microphones, positioned on basket stations, announcer headsets and handheld units, affixed to cameras, and throughout the venue to capture ambient noise. The microphones may transmit their audio signal by wire or wirelessly. At the production facility, the audio from the various microphones may be mixed using an audio mixer and provided as one or more feeds for broadcast.

The various audio and video feeds available from the event, including the live feed selected by the production team, may be transmitted from the production facility to other locations in a variety of ways, including microwave link, satellite transmission, or by wire, for example by fiber optic lines. Video feeds are typically transmitted in HD-SDI format and audio feeds are typically transmitted embedded within the HD-SDI feeds as AES3 channels (a digital audio standard developed by the Audio Engineering Society and European Broadcasting Union). The feeds may be transmitted to one or more other facilities for additional processing, storage, or distribution to viewers, for example, through broadcast or cable television networks or to content distribution networks for video streaming services.

Description of Illustrative Embodiments

Production of Alternative Views for Display on Different Types of Devices

One or more alternative views or programs may be produced in parallel to the primary programming and provided to viewers using certain types of devices, for example, mobile phones, laptop computers, or tablets as described above using the systems and methods disclosed herein. Each additional, alternative view may be created by substituting, in an additional, parallel feed, the video feed from one or more cameras for the video feed from one or more other cameras. Although incorporating video from a different camera, the substituted, alternative view may maintain the production team's choices regarding camera angles or perspectives selected for the broadcast of event. For example, an alternative view camera may be placed near or adjacent to the main, play-by-play camera in a basketball arena, such that it provides a similar perspective or camera angle of the game, but is operated to provide a tighter or closer-framed shot of the game than the main play-by-play camera. By substituting the feed from the alternative view camera for that of the main play-by-play camera, the production team can continue to make the same decisions about which camera angles to use in the broadcast, because the perspective or camera angle offered by the alternative view camera is similar to that of the main play-by-play camera. The resulting alternative view feed may then be provided for distribution to viewers using certain types of devices, providing a similar view of the game, but tailored for viewing on that type of device.

Alternative View Cameras and Video Production

FIG. 1 shows a block diagram for one embodiment of the system. This figure shows a use of the system for producing a broadcast of an event 100 with a plurality of cameras available for use. Standard cameras 135 and standard camera 132 are positioned at various locations to record the event 100. Alternative view camera 131 in this embodiment is located adjacent to standard camera 132 and will record the event 100 from a similar perspective but may be framed differently. In other embodiments, alternative view camera 131 may be located apart from standard camera 132 to provide a different perspective, or may provide a different type or quality of video feed. Each of the standard camera feeds 210 may be sent to an optional camera control unit 120 and each of the alternative view camera feeds may be sent to an optional camera control unit 121.

In some embodiments, the camera control unit(s) 120 may be located in a truck or control booth containing one or more production switchers. Camera control units 120 receive video signals from cameras and are operable to control certain aspects of the camera, for example, aperture, color balance and levels. Camera control units may send the various camera feeds to production and processing 400.

Production and processing 400 produces a standard program 230 from the various standard camera feeds and may create an alternative program 330 using alternative view camera feeds 310 in place of some standard camera feed(s) 210. For example, in the embodiment described by the diagram in FIG. 1, an alternative program 330 may be identical to a standard program 230 except when the feed from standard camera 132 is active in the standard program 230, the feed from alternative view camera 131 will be substituted to form an alternative program 330. Production control may occur near the camera control unit or may occur at another location. Production and processing 400 may be divided across multiple locations or may occur at a single location.

The standard program 230 and alternative program 330 may be sent to distributor 140. Distributor 140 might format and repackage the programs for delivery to live television broadcasts via satellite, cable, over-the-air, or internet delivery. The newly formatted standard program 240 and newly formatted alternative program 340 can then be delivered from the distributor 140 to end user 150.

Production and Processing

Figure 2:
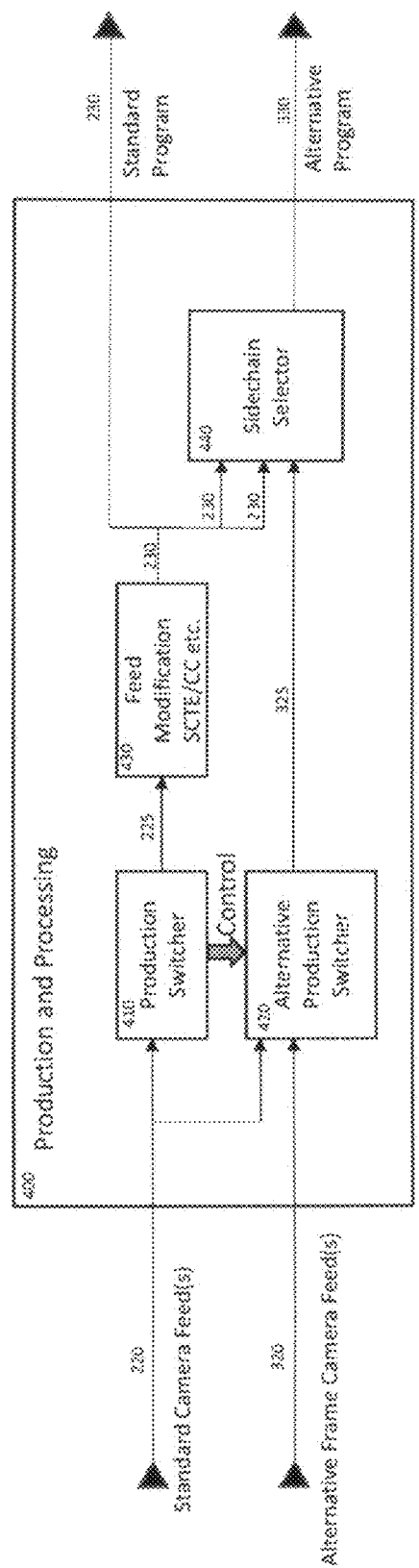
FIG. 2 is a block diagram of a production and processing unit that facilitates the near-simultaneous production of standard programming and alternative view programming.

FIG. 2 shows a block diagram of one embodiment of the system. In some embodiments, the functions described in production and processing unit 400 are performed at a single location. In other embodiments, the functions are collectively performed in multiple locations, such as at a production truck in combination with a central processing facility.

Standard camera feed(s) 210 and alternative view camera feed(s) 310 are received at production and processing unit 400 which may comprise one or more production switchers, such as a Grass Valley Kayenne. Standard camera feed(s) 210 is sent to production switcher 410 and to alternative production switcher 420. Alternative view camera feed(s) 310 is sent to alternative production switcher 420.

Production switcher 410 selects from the various camera feeds and/or additional content available to the production switcher. The various standard camera feed(s) and additional content are mixed and spliced to form a single standard program feed 225. Each of the decisions made at production switcher 410 is copied at alternative production switcher 420.

Alternative production switcher 420 receives the standard camera feed(s) 210 and alternative view camera feed(s) 310. Each of the selections made in production switcher 410 is also made in alternative production switcher 420 except the alternative camera feed(s) 310 is substituted for standard camera feed(s) 210 as applicable to create alternative program feed 325. In the example from FIG. 1, if camera 132 is selected for the standard program feed, then alternative camera 131 is selected to create alternative program feed 325.

In some embodiments, a single production switcher with multiple buses may be used in place of a separate production switcher 410 and alternative production switcher 420. In such embodiments, a first bus is used to select the standard program feed 225, and a second bus is used to select the alternative program feed 325. In some embodiments, the feed selection made by production switcher 410 (or the first bus) is copied in the alternative production switcher (or the second bus) by bus linking.

For example, a first camera feed and a second camera feed may be input to a first production switcher or bus to create a first program. The second camera feed and a third camera feed may be input to a second production switcher or bus to create a second program, identical to the first program except when the first camera feed is active in the first program, the third camera feed is active in the second program.

Standard program feed 225 is sent to feed modification 430 for further modification to include additional features such as closed captioning or SCTE ("Society of Cable and Telecommunications Engineers") triggers as discussed below to create standard program 230.

Standard program 230 and alternative program feed 325 are sent to a data keyer 441 within the sidechain selector 440. Data keyer 441 is triggered to apply any modifications present in standard program 230 to alternative program feed 325 to create modified alternative feed 326. These modifications may include content modifications as well as closed captioning or SCTE via device 441. The resulting modified alternative feed 326 is identical to standard program 230 with respect to added content. The only substantial difference between the programs is that alternative cameras feed(s) 310 replaces the standard cameras feed(s) 210 where applicable. Change over switcher 442 selects the modified alternative feed 326 or standard program 230 as the output for alternative program 330.

Standard program 230 and alternative program 330 are now prepared and ready for distribution.

Sidechain Selector

Figure 3:
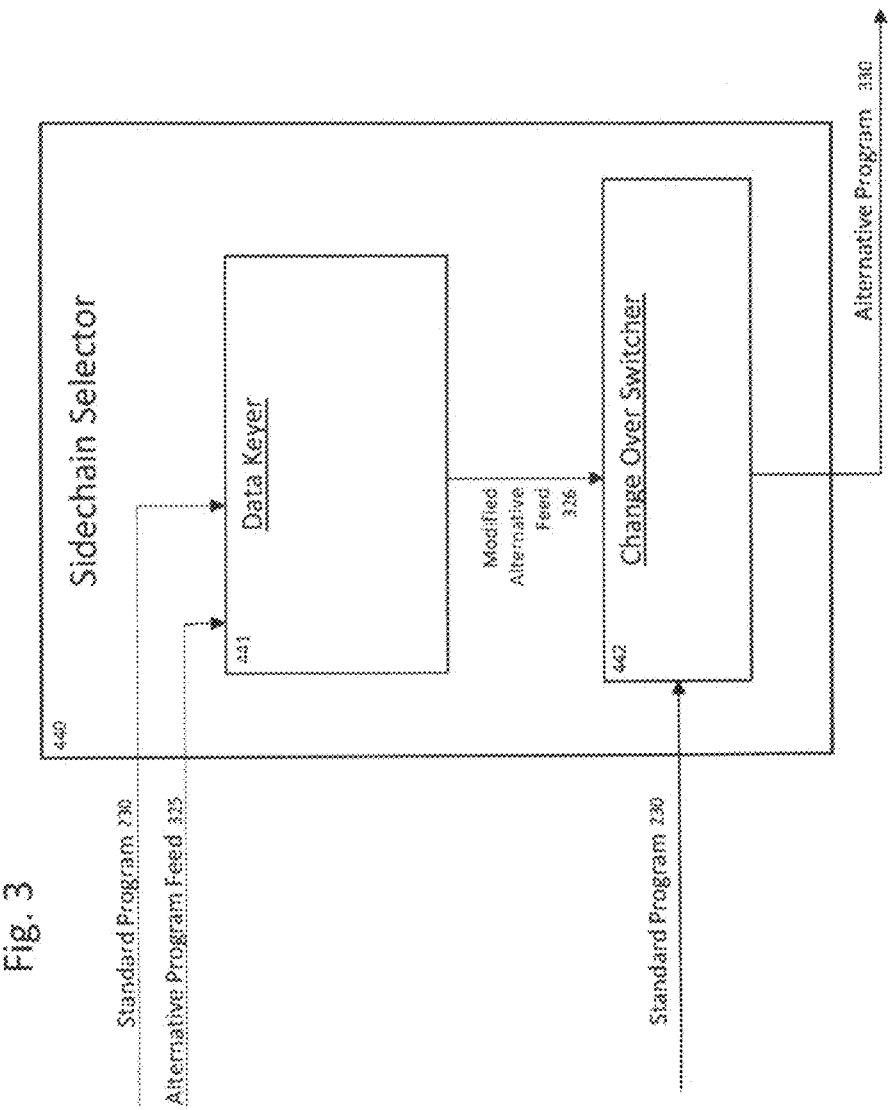
FIG. 3 is a block diagram of a sidechain selector, which in some embodiments is a component of program processing

FIG. 3. shows a diagram of another embodiment of the system. Sidechain selector 440 receives standard program 230 and alternative program feed 325. The sidechain selector may act individually or may comprise two or more separate components, which can be accomplished by a variety of techniques. In some embodiments with a sidechain selector, one component is a VANC (vertical blanking ancillary data) data keyer 441 that applies modifications to the alternative program feed 325. These modifications may include content modifications as well as closed captioning or SCTE via device 441. In some embodiments with a sidechain selector, one component of a sidechain selector is a change over switcher 442.

VANC Data Keyer

In some embodiments, a data keyer 441 is the first component of the sidechain selector. Data keyer 441 receives alternative program feed 325 and standard program 230. Data keyer 441 copies additional modifications (such as closed captioning or SCTE triggers) from the standard program 230 onto alternative program feed 325 to create modified alternative feed 326. The data keyer is used, for example, to control the triggers in the feed that indicate ad insertion points or other "in-feed" data. One common standard for this type of trigger is SCTE-35, an ANSI/Society of Cable and Telecommunications Engineers trigger that signals when to insert content such as local advertising. The data keyer 441 extracts the commercial triggers and closed captioning information from the typical broadcast feed and inserts the triggers and closed captioning into alternative program feed 325 to create modified alternative feed 326. Data keyer 441 then outputs the modified alternative feed 326 with additional modifications to change over switcher 442.

Change Over Switcher

The change over switcher 442 detects whether a standard camera feed 210 is in use in standard program 230. If a standard camera feed 210 is in use in standard program 230, then the modified alternative feed 326 is output from change over switcher 442 as alternative program 330. If a standard camera feed 210 is not in use in standard program 230, then standard program 230 is output from change over switcher 442 as alternative program 330. The modified alternative feed 326 is identical to the standard program 230 used in a typical broadcast, except when the selected standard camera is in use for the typical television broadcast, the selected alternative view camera will be in use for the modified alternative feed 326. This change over switcher performs its function in real-time, or near-real time, to produce the additional stream that is sent simultaneously with one for traditional broadcast viewing. The change over switcher facilitates production of this alternative program feed with minimal additional operator support.

Mobile Device Viewing

Figure 4:
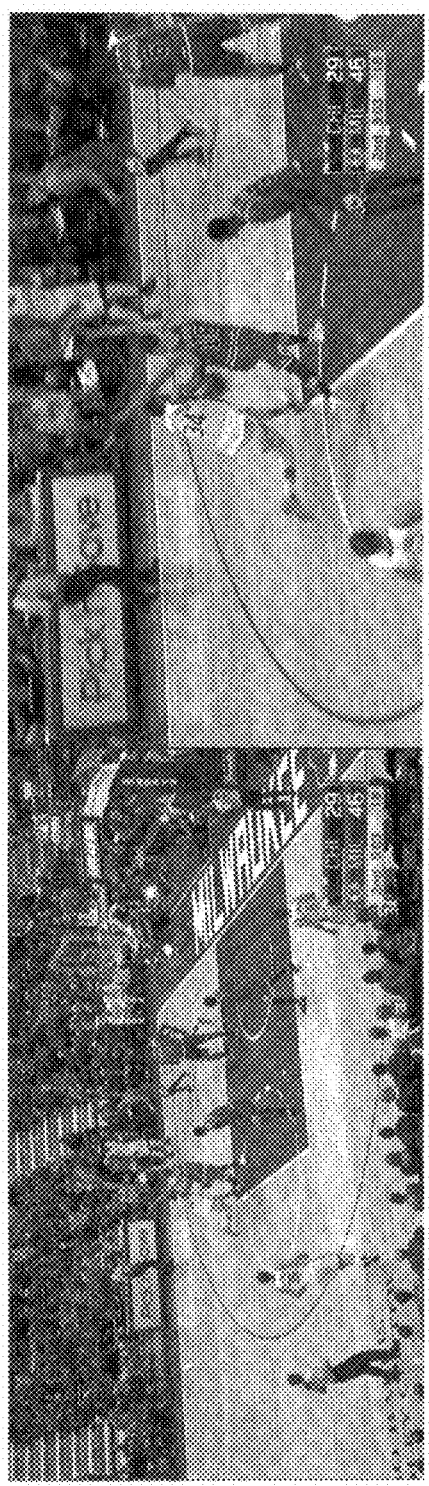
FIG. 4 is a screenshot comparison between standard programming and alternative programming specifically intended for use on mobile devices

FIG. 4 shows a side by side view of two screenshots of the same basketball game. On the left is a typical basketball television broadcast that may be produced as a standard program 230. On the right is a broadcast of an alternative view camera that might appear in an alternative program 330 in one embodiment of the system. In some embodiments, alternative program 330 may be provided for viewing on smaller screens or displays such as those on mobile device, mobile phones, or tablets. In those embodiments, alternative program 330 may provide a tighter, closer-framed view that enhances the detail of the content, rather than a more expansive view, for enhanced viewing on such smaller screens or displays.

Live Streaming

In some embodiments, the method and system can stream events live or near live. In live streaming embodiments, the method and system described can substitute alternatively framed video for some or all video that is prepared for live streaming in a typical broadcast. In those embodiments, an alternative program can be prepared and distributed with minimal additional resources. For example, the typical television broadcast of professional sports such as basketball is currently available for live streaming to internet connected devices, including mobile phones and tablets. In some embodiments, the method and system disclosed here can provide an alternative program that may be more suitable to viewing live content on the mobile device. In other embodiments, the alternative video program may be stored and supplied as video-on-demand.

Alternative View Camera

In some embodiments of the claimed system and method, there is an alternative view camera, which is a camera that records images with an alternative view to that of another camera. An alternative view camera may be operated by a camera operator that shoots the video in a manner appropriate for viewing on an alternative display. In some embodiments, an alternative view camera is a camera with capability suited for the alternative display, such as a camera with high zoom for use on small displays or wide angle lens for use on very large display. An alternative view camera may also receive a "tally" or other signal that it is providing the live video feed at the same time a selected standard camera is providing the video feed to traditional television broadcast.

In some embodiments, an alternative view camera is placed near or adjacent to a standard camera for a typical television broadcast that it will be substituted for. Such placement can allow the camera to have a similar perspective to a standard camera that is part of a typical broadcast. In some embodiments, providing an alternative view camera feed from a similar perspective ensures that the alternative view and the view it is replacing are capturing similar content and will conform with any audio commentary or other added content. In some embodiments, a camera operator will employ filming techniques designed for viewing on an alternative display device.

In some embodiments, the alternative view camera is operated to capture images that are appropriate for viewing on small screens such as those on mobile phones and tablets. Camera operators can frame and compose their shots to produce video better suited for viewing on a small screen. For example, camera operators at a basketball game can focus on the athlete with the ball, and gently pan out to the basket when the player shoots the basketball. Such an approach may be preferable to a more typical wide shot that captures the player and the goal and is also preferable to a close-up shot that follows the arc of the ball through the air. For musical performances, adjusting the view of the camera to more closely frame a single musician may provide an improved viewing experience.

In some embodiments, an alternative view camera should be adjusted to match the color, brightness, contrast, or other settings of other cameras used in the broadcast of the event. By matching the characteristics of any other cameras that are in use to create the alternative programming, jarring or otherwise unappealing transitions can be minimized. These or other settings may require periodic adjusting to maintain the desired consistency between the multiple camera feeds.

Selected Camera Feed Replacement

In some embodiments, the alternative display program feed sent to the end users can be created in part by replacing a selected camera feed with an alternative view camera feed, while other camera feeds may remain the same in the typical broadcast program and alternative display program. Video shots from cameras other than the selected camera (such as those of the audience, other team members, or other images from secondary cameras) are still sent to the end user of the alternative view program. In some embodiments, a production switcher or other switching mechanism replaces only the selected camera feed with the alternative view camera feed.

Distribution

In some embodiments, distribution of the alternative display programming can be accomplished using techniques that are similar to previously available methods, with which persons of skill in the art are familiar. In some embodiments, a central processing facility can provide the alternative display feed production and distribution. For a typical television broadcast, a central processing facility may be used to combine and condition the various camera feeds and any alternative footage or content into a continuous stream for viewing by the end user. Examples of additional content may include scoreboards, views of the stadium, views of the crowd, replays, or interviews. In some embodiments, programming for the alternative display end user is created similarly, using many of the same resources that are used for a live broadcast. An alternative view program can be created by substituting an alternative view camera feed for a selected standard camera feed. In some embodiments, this can be accomplished by using a sidechain selector, which allows the production of a single feed, but with automatic substitution of the alternative view camera feed when the selected camera feed is in operation.

In some embodiments, feeds are encoded for distribution using an encoder that encodes HD-SDI video into H.264 format. For example, an Evertz model 3480 can perform mezzanine compression to encode H.264 video at 30 MB quality from the HD-SDI video. In some embodiments, the feeds can be directly distributed to users. In some embodiments, the feeds are sent to distributors for further encoding to provide a variety of quality and formatting for delivery to the end user. In some embodiments, the type of device being used by the end user, e.g., a mobile device with a small screen, may be determined and the appropriate program, either the standard program or alternative program, may be provided to the end user based on that determination. In other embodiments, the end user may select which program to view, either the standard program or alternative program, and the appropriate program may be provided in response to the end user's selection.

Recorded Viewing

In some embodiments, the feed developed for alternative displays can be stored and used later. For example, some embodiments of the method and system are particularly useful for preparing highlights, replays, or other video on alternative display devices. This is particularly useful because highlight consumption on mobile devices though social media is significant. In some embodiments, the closer views of the recorded highlights can improve the mobile user experience.

The disclosed systems and methods may also be used in recorded video programs, such as television shows, other sporting events, or movies. An alternative view camera may be substituted for the standard view camera during the editing process, such that an alternative view program is produced in parallel with the standard view program.

Alternative Graphics

In some embodiments, an alternative set of graphics could be applied to the alternative view camera feed, instead of applying the same package as used for the television broadcast feed. One way the alternative view camera feed provides a superior experience on a smaller screen is by enlarging key areas of the action relative to the screen size and removing less important portions of the typical television broadcast view. A similar approach could allow the user to optionally adjust the overlaid graphics for an alternative program to better meet the preferences of mobile viewers.

Multiple Alternative View Cameras

In some embodiments, the system and method may include a plurality of alternative view cameras, each providing an alternative view to that provided by a standard camera. The production and processing unit could apply the same switching function for these additional cameras such that when a camera is selected for the typical television broadcast, the corresponding alternative view camera is selected for the alternative view feed.

What is claimed is:

1. A system for providing alternative views for display on different types of devices, comprising:
    a first camera outputting a first video signal, a second camera outputting a second video signal, and a third camera outputting a third video signal;
    a first switch having a first input, a second input, and a first output, wherein the first video signal is received at the first input and the second video signal is received at the second input, and operable to switch between the first input and the second input to the first output; and
    a second switch having a third input, a fourth input, and a second output, wherein the third video signal is received at the third input, and the second video signal is received at the fourth input wherein the second switch is operable to:
    responsive to the first switch switching the first input to the first output, switch the third input to the second output; and
    responsive to the first switch switching the second input to the first output, switch the fourth input to the second output.

2. The system of claim 1, wherein the first camera is located near the third camera.

3. The system of claim 1, wherein the third camera provides a tighter field of view than the first camera.

4. The system of claim 1, wherein the first camera provides a wider field of view than the third camera.

5. The system of claim 1, wherein the first, second, and third cameras are located at an event.

6. The system of claim 1, wherein the first output is to be provided to a first type of device and the second output is to be provided to a second type of device that is different from the first type of device.

7. The system of claim 5, wherein the event is a basketball game.

8. The system of claim 6, wherein the second output is to be provided to a mobile device.

* * * * *